(12) United States Patent
Dahir et al.

(10) Patent No.: US 10,819,667 B2
(45) Date of Patent: Oct. 27, 2020

(54) IDENTIFICATION AND LOGGING OF CONVERSATIONS USING MACHINE LEARNING

(71) Applicant: Cisco Technology, Inc., San Jose, CA (US)

(72) Inventors: Hazim Hashim Dahir, Raleigh, NC (US); Ibrahim Amir Darwish, Morrisville, NC (US); Mark Ammar Rayes, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/916,422

(22) Filed: Mar. 9, 2018

(65) Prior Publication Data

US 2019/0280996 A1  Sep. 12, 2019

(51) Int. Cl.
| | | |
|---|---|---|
| *H04L 12/58* | (2006.01) | |
| *G10L 15/26* | (2006.01) | |
| *G06N 20/00* | (2019.01) | |
| *G06F 40/10* | (2020.01) | |
| *G06F 40/20* | (2020.01) | |

(52) U.S. Cl.
CPC ............ *H04L 51/046* (2013.01); *G06F 40/10* (2020.01); *G06F 40/20* (2020.01); *G06N 20/00* (2019.01); *G10L 15/265* (2013.01); *G10L 15/26* (2013.01)

(58) Field of Classification Search
CPC .................................................... H04L 51/046
USPC ......................................................... 709/206
See application file for complete search history.

(56) References Cited

U.S. PATENT DOCUMENTS

| | | | | | |
|---|---|---|---|---|---|
| 5,764,731 | A  * | 6/1998 | Yablon | .................. | H04M 1/271 379/213.01 |
| 6,606,644 | B1 * | 8/2003 | Ford | .................. | H04L 12/1831 709/203 |
| 8,762,302 | B1 * | 6/2014 | Spivack | ................. | G06N 5/046 706/12 |
| 8,769,028 | B2 * | 7/2014 | Herold | .................. | G06Q 10/10 709/206 |

(Continued)

OTHER PUBLICATIONS

Kim, "Internet-centric solution is more than moving online", Lexology, 2015 (Year: 2015).*

(Continued)

*Primary Examiner* — Ondrej C Vostal
(74) *Attorney, Agent, or Firm* — Behmke Innovation Group LLC; Kenneth J. Heywood; Jonathon P. Western (57) ABSTRACT

In one embodiment, a processor receives data indicative of a plurality of conversations involving a primary user. The processor identifies a subset of the plurality of conversations that are regarding a particular topic. The processor adds a conversation to the subset based on a match between one or more keywords in the conversation matching a list of keywords associated with the particular topic. The processor uses a machine learning-based model to identify one or more context characteristics of the conversations in the identified subset. The processor updates the subset of conversations by adding at least one of the conversations to the subset based on the at least one conversation having at least one context characteristic identified by the machine learning-based model. The processor provides data indicative of the updated subset of conversations to a user interface for review by the primary user.

17 Claims, 5 Drawing Sheets

(56) References Cited

U.S. PATENT DOCUMENTS

| | | | |
|---|---|---|---|
| 9,009,592 B2 | | 4/2015 | Friend et al. |
| 9,978,372 B2* | | 5/2018 | Orthagen ............ G10L 15/1815 |
| 2010/0302129 A1* | | 12/2010 | Kastrup ................ G06F 3/1446 |
| | | | 345/1.3 |
| 2011/0119593 A1* | | 5/2011 | Jacobson .............. G06Q 30/02 |
| | | | 715/736 |
| 2011/0154266 A1* | | 6/2011 | Friend .................... A63F 13/06 |
| | | | 715/863 |
| 2013/0275413 A1* | | 10/2013 | Snir ................... H04L 67/2804 |
| | | | 707/722 |
| 2013/0304678 A1* | | 11/2013 | Gradit .................... H04L 67/38 |
| | | | 706/12 |
| 2014/0006518 A1* | | 1/2014 | Sinkov ................... H04L 51/32 |
| | | | 709/205 |
| 2014/0020115 A1* | | 1/2014 | Le Chevalier ........ G06F 17/241 |
| | | | 726/28 |
| 2014/0129331 A1* | | 5/2014 | Spivack ............. G06Q 30/0269 |
| | | | 705/14.53 |
| 2015/0026269 A1* | | 1/2015 | Canton .................. H04L 51/04 |
| | | | 709/206 |
| 2015/0348538 A1 | | 12/2015 | Donaldson |
| 2016/0065731 A1 | | 3/2016 | Kurstak et al. |
| 2016/0094646 A1* | | 3/2016 | Spivack ................ H04L 65/403 |
| | | | 709/204 |
| 2016/0219416 A1* | | 7/2016 | Cromack ................ H04W 4/06 |
| 2016/0224662 A1* | | 8/2016 | King ..................... G06F 16/951 |
| 2016/0337295 A1 | | 11/2016 | Bennett et al. |
| 2017/0180284 A1* | | 6/2017 | Smullen ................ H04L 67/322 |
| 2017/0208022 A1* | | 7/2017 | Drazin .................. H04L 51/046 |
| 2017/0242845 A1 | | 8/2017 | Clark et al. |
| 2018/0049716 A1* | | 2/2018 | Rajagopal ............. G01S 15/899 |
| 2018/0129648 A1* | | 5/2018 | Chakravarthy ........ G06N 3/006 |
| 2018/0232705 A1* | | 8/2018 | Baker ................ G06Q 10/1095 |

OTHER PUBLICATIONS

Microsoft Computer Dictionary, "real-time", p. 441, 2002 (Year: 2002).*

Expert System, "machine learning", 2020 (Year: 2020).*

Gil, et al., "Capturing Common Knowledge about Tasks: Intelligent Assistance for To Do Lists", ACM Transactions on Interactive Intelligent Systems (TiiS)—Special Issue on Common Sense for Interactive Systems, vol. 2 Issue 3, Article No. 15, Sep. 2012, 37 pages, ACM.

Longstaff, Brent A., "Learning Individuals' Patterns and Contextual Events with Mobile Data Streams", Peer reviewed Thesis/dissertation, UCLA Electronic Theses and Dissertations, https://escholarship.org/content/qt83n5s98q/qt83n5s98q.pdf?nosplash=67ccd4c2fd7fdb77d3b19dcddb6dd0d2, 107 pages, Jan. 1, 2015, University of California.

Mafrur, et al., "Modeling and discovering human behavior from smartphone sensing life-log data for identification purpose", Human-centric Computing and Information Sciences, 2015, 14 pages, BioMed Central Ltd.

Rachuri, Kiran K., "Smartphones based Social Sensing: Adaptive Sampling, Sensing and Computation Offloading", https://www.cl.cam.ac.uk/~cm542/phds/kiranrachuri.pdf, Dissertation, Computer Laboratory, St. John's College, 2012, 204 pages, University of Cambridge.

"MinuteHero—AI-driven meeting minutes", https://www.minutehero.net/, Accessed on Dec. 18, 2017, 3 pages, MinuteHero.

"Network Security Analytics", https://www.extrahop.com/solutions/initiative/security/, Accessed on Dec. 18, 2017, 6 pages, ExtraHop Networks.

Ron Miller; https://finance.yahoo.com/news/voicera-lands-20-millon-help-13283943; Voicera lands $20 million with help from big-time enterprise investors; Mar. 7, 2018; pp. 1-6.

https://en.wikipedia.org/wiki/Google_Home; Google Home; pp. 1-9.

https://en.wikipedia.org/wiki/Amazon_Alexa; Amazon Alexa; pp. 1-18.

* cited by examiner

FIG. 5

IDENTIFICATION AND LOGGING OF CONVERSATIONS USING MACHINE LEARNING

TECHNICAL FIELD

The present disclosure relates generally to computer networks, and, more particularly, to the identification and logging of conversations using machine learning.

BACKGROUND

The Internet of Things, or "IoT" for short, represents an evolution of computer networks that seeks to connect many everyday objects to the Internet. Notably, there has been a recent proliferation of "smart" devices that are Internet-capable such as thermostats, lighting, televisions, cameras, and the like. Coupled with this growth of smart devices has been an increased interest in voice recognition, to provide control over these devices. For example, intelligent personal assistant devices may passively listen for a user to issue an audible control command.

New opportunities arise with the proliferation of voice-based personal assistants, beyond simply controlling IoT devices. Stress, dementia, and other factors sometimes cause people to be forgetful of certain important interactions in their daily lives. In addition, spontaneous meetings where a user is not prepared with a notepad, or is too embarrassed to take notes, may cause the user to avoid certain relationships and/or fail to perform certain tasks.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a processor receives data indicative of a plurality of conversations involving a primary user. The processor identifies a subset of the plurality of conversations that are regarding a particular topic. The processor adds a conversation to the subset based on a match between one or more keywords in the conversation matching a list of keywords associated with the particular topic. The processor uses a machine learning-based model to identify one or more context characteristics of the conversations in the identified subset. The processor updates the subset of conversations by adding at least one of the conversations to the subset based on the at least one conversation having at least one context characteristic identified by the machine learning-based model. The processor provides data indicative of the updated subset of conversations to a user interface for review by the primary user.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Figure 1:
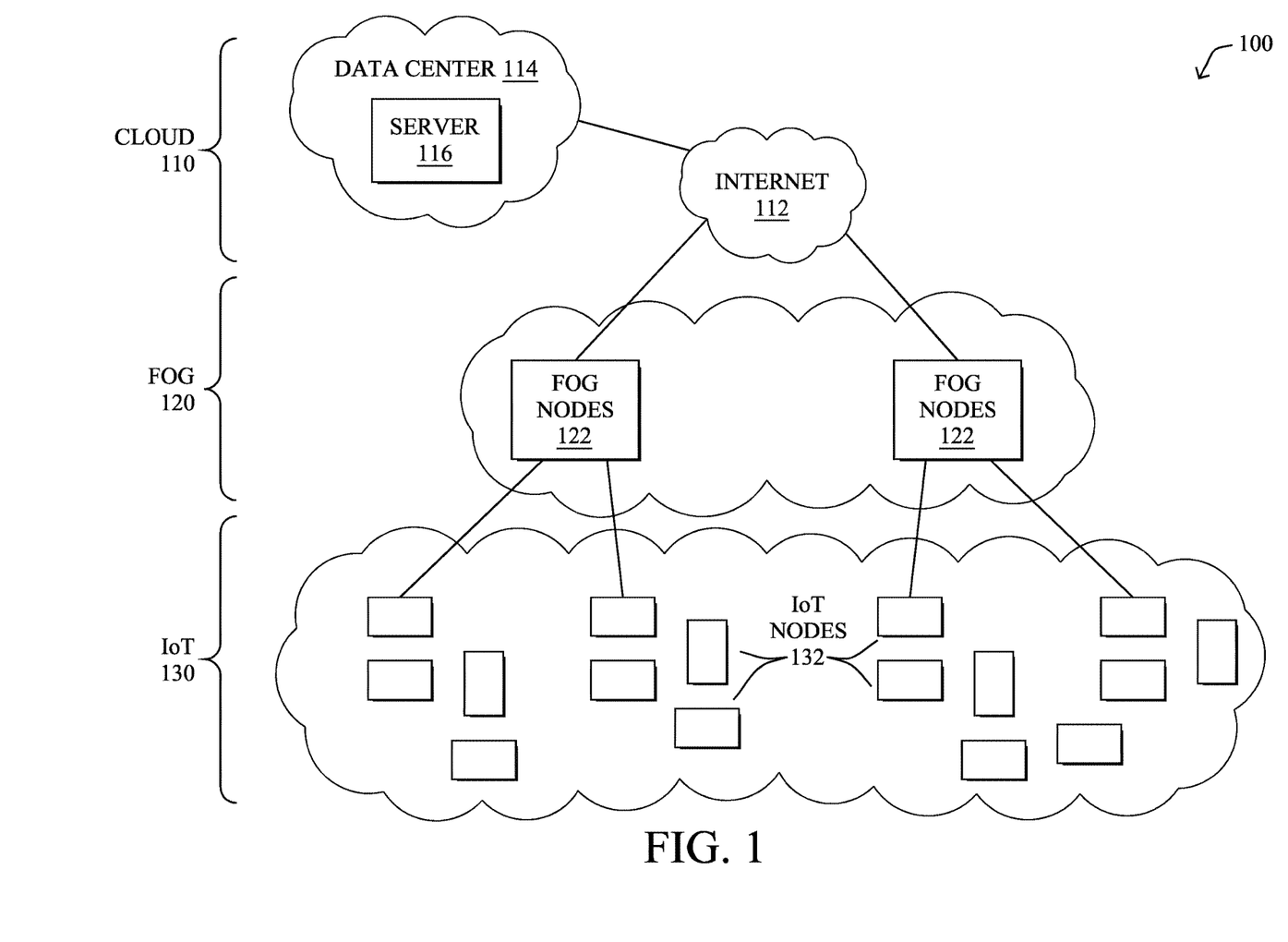
FIG. 1 illustrates an example computer network.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
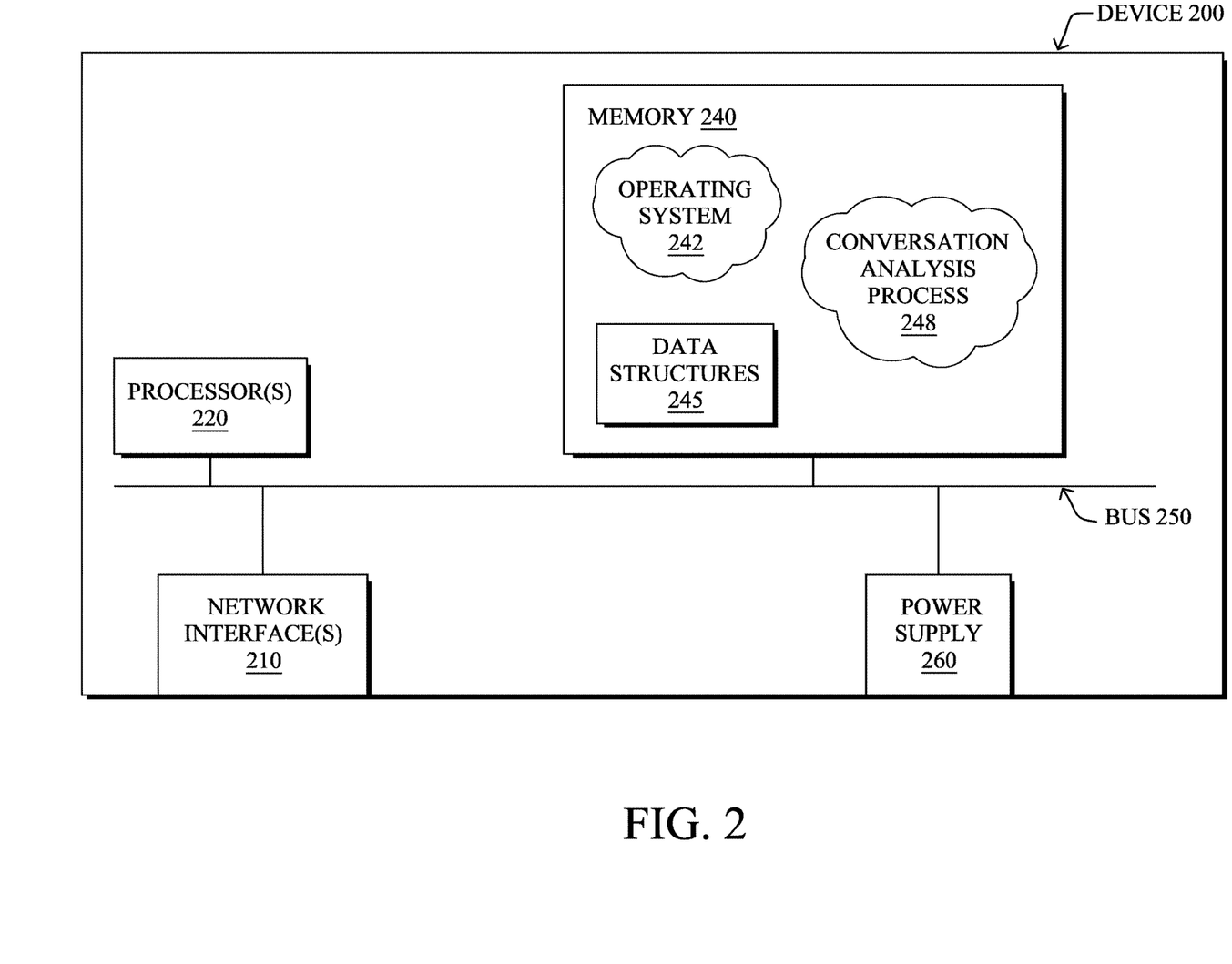
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. Operating system 242, portions of which is typically resident in memory 240 and executed by the processor, functionally organizes the device by, inter alia, invoking operations in support of software processes and/or services executing on the device. These software processes and/or services may comprise a conversation analysis process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, intelligent personal assistants have increased in popularity, in recent years. These assistants vary from specialized devices that can be placed throughout an environment (e.g., Amazon's Alexa, Google's Home, etc.) to smart phones and wearable devices (e.g., smart watches, etc.) that have integrated personal assistant functions. Typically, these personal assistants are focused on implementing voice control for the user. For example, a user may issue a voice command to a personal assistant to play music, perform an Internet search, etc. To a certain extent, these personal assistants can also be used to create to-do tasks for a user. However, this process also requires explicit voice control to do so. For example, the user may issue a voice command of "create a task for Monday to do X." Accordingly, opportunities still exist to apply more advanced analytics to voice recognition systems, such as voice-based personal assistants.

Identification and Logging of Conversations Using Machine Learning

The techniques herein assist a user in keeping an accurate log of his or her conversations over time, whether they are related to work or everyday tasks. In some aspects, the techniques herein capture various words spoken throughout a conversation (e.g., using natural language processing), to provide a summary of the conversation and/or build a task list for the primary user. In further aspects, the techniques herein can be used to identify the parties of a conversation, as well as other information such as the location and time of the interaction. In another aspect, the techniques herein may associate conversations with different topics, based on identified keywords. In addition, the techniques herein may leverage machine learning to learn additional context characteristics (e.g., additional keywords, specific parties to a conversation, locations, etc.) that can be used to further associate a particular conversation with a particular topic.

Specifically, according to one or more embodiments of the disclosure as described in detail below, a processor receives data indicative of a plurality of conversations involving a primary user. The processor identifies a subset of the plurality of conversations that are regarding a particular topic. The processor adds a conversation to the subset based on a match between one or more keywords in the conversation matching a list of keywords associated with the particular topic. The processor uses a machine learning-based model to identify one or more context characteristics of the conversations in the identified subset. The processor updates the subset of conversations by adding at least one of the conversations to the subset based on the at least one conversation having at least one context characteristic identified by the machine learning-based model. The processor provides data indicative of the updated subset of conversations to a user interface for review by the primary user.

Illustratively, the techniques described herein may be performed by hardware, software, and/or firmware, such as in accordance with the conversation analysis process 248, which may include computer executable instructions executed by the processor 220 (or independent processor of interfaces 210) to perform functions relating to the techniques described herein.

Figure 3:
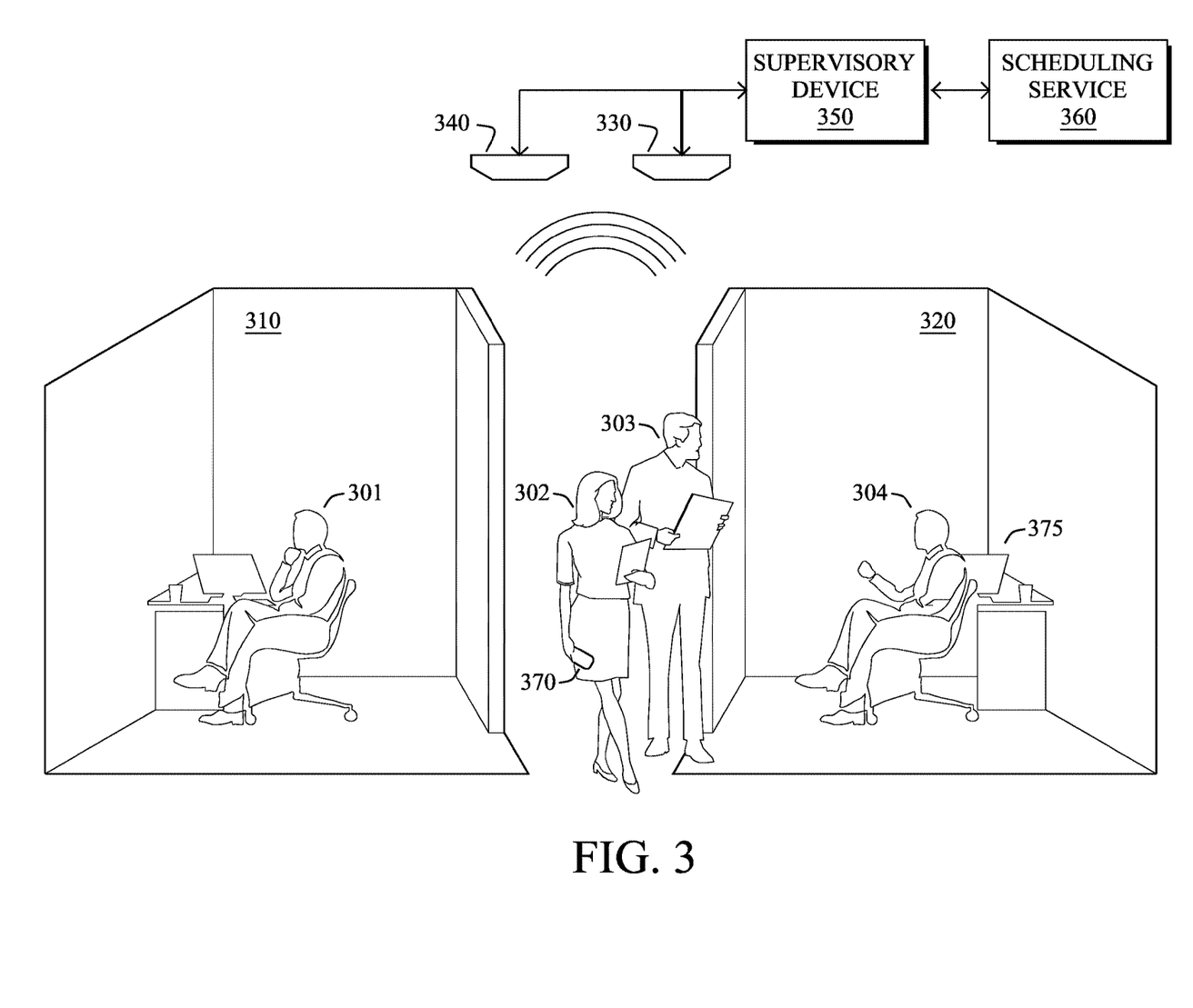
FIG. 3 illustrates an example of the capture of audio data.

Operationally, FIG. 3 illustrates an example of the capture of audio data, according to various embodiments. As generally shown, various users 301, 302, 303, and 304 may be located within a physical environment, such as an office building. More specifically, user 301 may be located in office 310, while user 304 is located in office 320.

Located throughout the physical location shown may be any number of audio capture devices. For example, there may be various microphones 330, 340 positioned to capture audio from users 301-304. In another example, a computer 375 may capture audio, such as when user 304 interacts with computer 375 (e.g., when user 304 interacts with a video-conferencing application, etc.). In a further example, as shown, user 302 may be carrying an audio capture device, such as a smart phone 370, a wearable device (e.g., smart watch, etc.), or the like.

A supervisory device 350 may be in control over microphones 330-340 and/or any of the other audio capture devices, such as computer 375 or phone 370. For example, supervisory device 350 may selectively control when microphone 340 is activated to capture audio from users 301-304. Also as shown, a service 360 may be in communication with supervisory device 350 to receive and analyze the captured audio data by microphones 330, 340. In other embodiments, service 360 may receive the captured audio data directly from any of the audio capture devices. Further, service 360 may be local to the various devices shown or may, in additional embodiments, be located remotely, such as a cloud-based service configured to analyze the captured audio.

For purposes of illustration, consider the case in which users 302 and 303 engage user 304 in a conversation. The corresponding audio of the conversation can be captured by any or all of the audio capture devices shown and analyzed by service 360 using the techniques described herein. As would be appreciated, any number of other forms of audio capture devices may be used to provide audio data to service 360.

Figure 4:
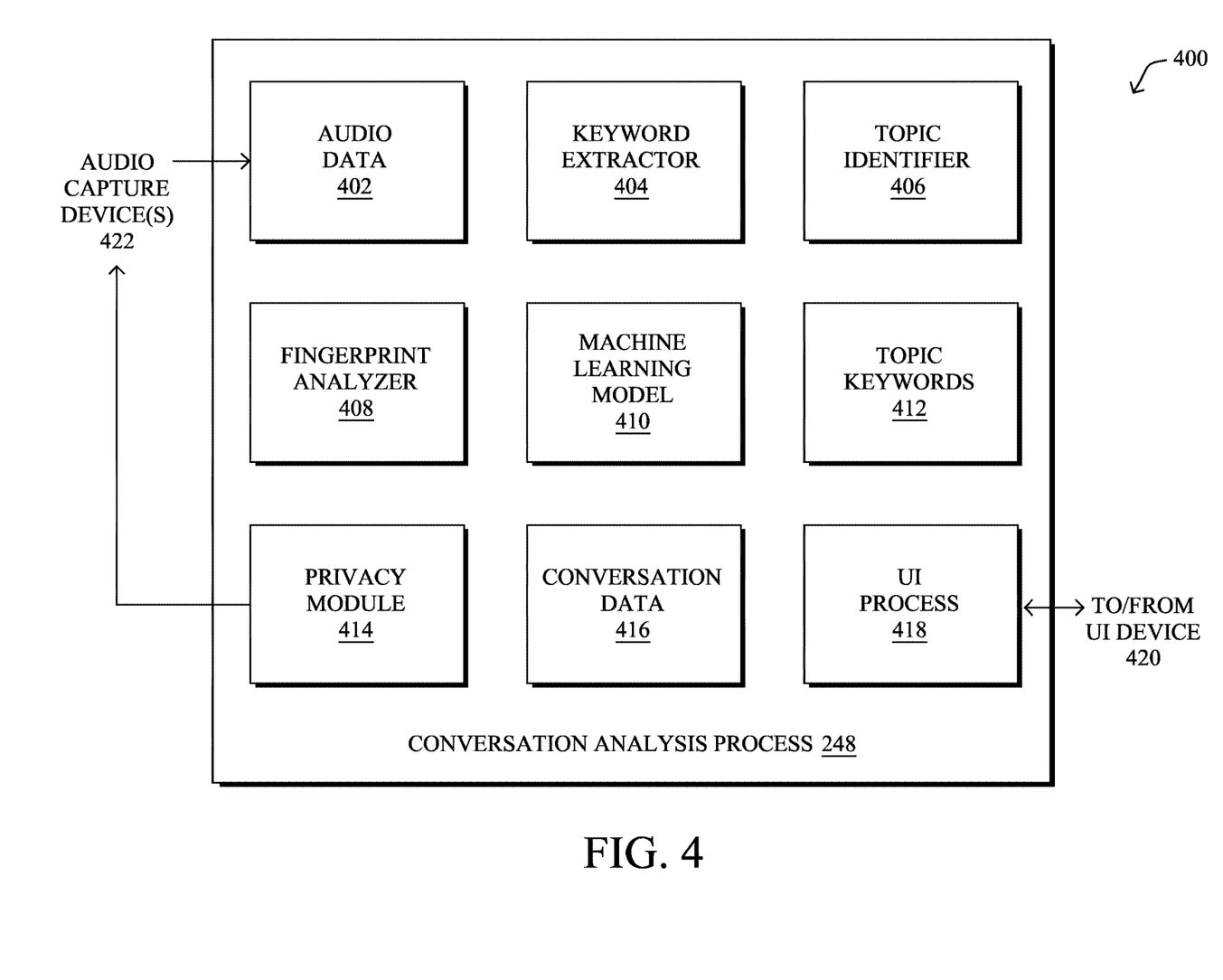
FIG. 4 illustrates an example architecture for identifying and logging conversations.

FIG. 4 illustrates an example architecture 400 for identifying and logging conversations, according to various embodiments. At the core of architecture 400 may be conversation analysis process 248 that may comprise any or all of the components 402-418 shown. In some implementations, the components of architecture 400 may be implemented as part of a service, such as service 360 shown in FIG. 3. Further, these components may be implemented in a distributed manner or implemented as their own stand-alone services, either as part of the local network or as a remote service. In addition, the functionalities of the components of architecture 400 may be combined, omitted, or implemented as part of other processes, as desired.

During operation, conversation analysis process 248 may receive data indicative of a plurality of conversations, such as audio data 402, from any number of audio capture devices 422. For example, audio data 402 may be captured by any number of computers, wearable devices, smart phones, deployed microphones, conferencing applications, or the like. As would be appreciated, conversation analysis process 248 may be executed on the same device as that of an audio capture device 422 or may receive audio data 402 from the capture device(s) 422 via a network.

In some embodiments, conversation analysis process 248 may include a fingerprint analyzer 408 configured to analyze audio data 402, in order to identify a primary user associated with the conversations captured in audio data 402. Notably, the primary user may employ conversation analysis process 248 to identify and log his or her conversations, so as to receive conversation summaries, timelines, tasks, or the like. In some embodiments, fingerprint analyzer 408 may identify the voice of the primary user by matching portions of audio data 402 to voice fingerprints supplied by the primary user, such as a pre-recording by the primary user. In other embodiments, fingerprint analyzer 408 may identify the primary user through continuous interaction with the primary user (e.g., by learning the voice fingerprint of the user over time).

In addition to the primary user, fingerprint analyzer 408 may also be configured to identify additional users that may be participants in a given conversation captured by audio data 402. In some cases, such as when the other user(s) are also primary users of conversation analysis process 248 (e.g., by matching his or her voice to a corresponding voice fingerprint, etc.). In other cases, fingerprint analyzer 408 may correlate spoken words by the user in question across different conversations in audio data 402. For example, even if other information about the other user is unavailable, fingerprint analyzer 408 may determine that the same user participated in conversations A, B, E, and G with the primary user. Of course, if additional information is available, fingerprint analyzer 408 may take this into account, to identify the participants in a given conversation. For example, if audio data 402 is captured from a telephone call or videoconference, fingerprint analyzer 408 may assess the contacts of the primary user, voicemails left by the other participant(s) (e.g., serving as voice fingerprints), or the list of meeting participants, to identify the other participant(s) in a conversation involving the primary user. In another embodiment, fingerprint analyzer 408 may identify another participating user by detecting the use of a name during the conversation.

In various embodiments, a keyword extractor 404 may extract keywords found in audio data 402 using Natural Language Processing (NLP). In turn, a topic identifier 406 may match the extracted keywords from keyword extractor 404 to those associated with a given topic in topic keywords 412. In some embodiments, the primary user may first define the topic keywords 412, such as through operation of a user interface (UI) device 420 that communicates with UI process 418 of conversation analysis process 248. For example, assume that the primary user wishes to capture information from the user's conversations about golf. In such a case, the primary user may specify keywords such as "golf," "clubs," "18 holes," etc. as being associated with this topic of conversation. In other embodiments, topic keywords 412 may be predefined and the primary user may simply specify that golf is a topic of interest that should be captured.

As would be appreciated, multiple topics may have overlapping keywords. Accordingly, topic identifier 406 may employ a word frequency measure, such as the term frequency-inverse document frequency (TF-IDF) of the various keywords used in a given conversation, to weight the keywords used in the conversation. Topic identifier 406 may then assign a topic to the conversations based in part on these weightings. In further embodiments, topic identifier 406 may use a summary algorithm, to analyze the keywords of the various conversations.

From the analysis of audio data 402 by keyword extractor 404, topic identifier 406, and/or fingerprint analyzer 408, conversation analysis process 248 may begin populating conversation data 416 with data regarding the subset of conversations from audio data 402 that involve a specific topic. For example, returning to the topic of "golf," conversation data 416 may include data regarding the conversations that the primary user had with others about golf. In various embodiments, such data may include, but is not limited to, any or all of the following:

Keywords used during the conversations, as identified by keyword extractor 404;
Topics of the conversations, as identified by topic identifier 406;
Users associated with the conversations, as identified by fingerprint analyzer 408; and/or
Any other information that may be associated with captured audio data 402 such as:
A geolocation of the audio capture device(s) 422 that captured the audio data 402 for a given conversation;
A timestamp or timeframe associated with audio data 402 for the conversation;
etc.

In various embodiments, UI process 418 may be configured to provide display and/or audio data to a UI regarding the conversations associated with a particular topic, based on conversation data 416. For example, UI process 418 may generate a timeline of conversations that the primary user had regarding a given subject and display this timeline for review by the primary user. Such a timeline may include where the conversation took place, the participants of the conversation, a summary of the conversation (e.g., based on the keyword weightings for the conversation), or the like. In another example, UI process 418 may automatically generate tasks to be performed by the primary user and/or other conversation participant(s), based on the keywords in the conversations regarding the topic. For example, if the topic is "groceries" and the primary user mentions "two cans of tomato soup" during one of the conversations associated with groceries, UI process 418 may automatically add a task of "purchase two cans of tomato soup" to a task list of the primary user and send data indicative of the task to the primary user (e.g., as a reminder).

According to various embodiments, conversation analysis process 248 may include a machine learning model 410 configured to learn and identify context characteristics of the conversations captured in audio data 402. In general, machine learning is concerned with the design and the development of techniques that receive empirical data as input (e.g., data regarding the association of a given conversation to a given topic) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function is a function of the number of misclassified points. The learning process then operates by adjusting the parameters a,b,c such that the number of misclassified points is minimal. After this optimization/learning phase, process 248 can use the model M to classify new data points, such as information regarding other conversations within audio data 402. Often, M is a statistical model, and the cost function is inversely proportional to the likelihood of M, given the input data.

Machine learning model 410 may include one or more supervised, unsupervised, or semi-supervised machine learning models. Generally, supervised learning entails the use of a training dataset, which is used to train the model to apply labels to the input data. For example, the training data may include sample conversations that may be labeled according to their topics. On the other end of the spectrum are unsupervised techniques that do not require a training set of labels. Notably, while a supervised learning model may look for previously seen keyword information that has been labeled accordingly, an unsupervised model may instead look to whether there are sudden changes in the sets of keywords present in the conversations of the primary user. Semi-supervised learning models take a middle ground approach that uses a greatly reduced set of labeled training data.

Example machine learning techniques that model 410 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like. More specifically, decision trees may be used to automatically create and explore what-if-then rules, in some embodiments. In further embodiments, a more advanced and robust solution can use a statistical model that allows for probabilistic decisions to be made (e.g., based on attaching real-valued weights to each keyword). Such statistical models have the advantage that they can express the relative certainty of a discussed slightly different word vs keyword, producing more reliable results.

The performance of machine learning model 410 can be evaluated in a number of ways based on the number of true positives, false positives, true negatives, and/or false negatives of the model. For example, the false positives of the model may refer to the number of times the model incorrectly labeled a conversation as being related to a given topic. Conversely, the false negatives of the model may refer to the number of conversations that were not labeled as related to the topic, but actually are. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives. In some cases, process 248 may also use reinforcement learning techniques which generally act to use feedback about the predictions, to adjust the underlying model 410. For example, an indication of a false positive from the primary user via UI process 418 may be used by process 248 to adjust the underlying model 410, to avoid such predictive mistakes in the future.

One function of machine learning model 410 is to learn the context characteristics of the conversations of the primary user and, in turn, use these characteristics to update conversation data 416. In one embodiment, machine learning model 410 may assess the context characteristic(s) of the conversations associated with a given topic, to identify other conversations that may also be related to that topic. For example, consider the case in which topic identifier 406 identifies conversations A, B, and C in audio data 402 as relating to the topic of "golf," based on the list of topic keywords 412. During these conversations, the participants may repeatedly use the proper noun, "Meadowbrook," in reference to a particular golf course. Now, assume that the list of topic keywords 412 does not include an entry for "Meadowbrook." In such a case, machine learning model 410 may learn over time that the keyword "Meadowbrook" is also associated with the topic of golf and, in turn, update the set of golf-related conversations to also include those conversations in which "Meadowbrook" is mentioned (e.g., using the existing criteria, such as keyword weights, etc.).

In another example of learning, assume that a large majority of conversations that the primary user has with user "Gary" are identified by topic identifier 406 as relating to golf. By analyzing the conversation participants, as distinguished by fingerprint analyzer 408, machine learning model 410 may learn over time that conversations involving Gary are more likely to be related to golf. In turn, machine learning model 410 may, in some embodiments, increase a score or other probability of other conversations between the primary user and Gary that associates that conversation with the topic of golf. In doing so, machine learning model 410 may identify other conversations that are also golf-related, but were not identified as such from the initial set of topic keywords 412.

Another potential function of machine learning model 410 may be to learn associations between tasks created by the primary user and the conversations from audio data 402. For example, assume that the primary user creates a new task (e.g., in a scheduling or task management application), immediately following a conversation captured in audio data 402. In such a case, machine learning model 410 may learn over time the association between the conversation keywords that may lead to the creation of such a task and, in turn, begin suggesting new tasks to the primary user or even automatically creating tasks on behalf of the user.

In some cases, conversation analysis process 248 may also include a privacy module 414 configured to enact certain privacy-related features. There are various factors that may affect how the system captures audio data 402, as well as how audio data 402 is stored. These factors may include, but are not limited to, the following:

Applicable privacy laws—depending on the locations of the conversation participants, the applicable laws may require all parties to consent to the capturing of the audio of the conversation. For example, certain U.S. states are one party consent states, requiring only one conversant to agree to the recording. However, other U.S. states are two party consent states, requiring both (or all) participants to agree to the recording.

Ethical considerations—certain professions may restrict the recording of certain conversations due to doctor-patient confidentiality, attorney-client privilege, etc.

User preference—even without a legal or ethical bar against the recording of conversations, some users may not wish to be recorded.

In some embodiments, privacy module 414 may provide control over the audio capture device(s) 422 based on the conversation participants identified by fingerprint analyzer 408, the location(s) associated with the participants, and/or other factors. In one embodiment, the primary user may specify to privacy module 414, via UI process 418, a list of privacy categories that may include any or all of the following:

Always Record List: For example, this may be for work-related conversations and locations.

Maybe Record List: Sends a notification via UI process 418 to alert the primary user and request consent to recording.

Never Record List: When participants are determined to be none-of-the-above.

For the majority of the cases, it is envisioned that the techniques herein will be used in controlled environments where some level of reduced privacy rights are assumed and accepted by participants. For example, certain users in an office or corporate environment may consent to audio recording as part of their employee agreements, etc. For the purposes of identifying the voice fingerprints of the consenting users, a voice sample may also be submitted. If an unrecognized voice is then present in a conversation, privacy module 414 may employ a default level of privacy, according to the applicable laws or other system settings (e.g., if an unknown participant is heard, privacy module 414 may stop recording the conversation, may stop recording after a few seconds, etc.).

In some embodiments, privacy module 414 may instruct the audio capture device(s) 422 to only sample a given conversation. Such sampling may entail, for example, recording the conversation only until the topic of conversation has been identified. In another example, privacy module 414 may instruct the audio capture device(s) 422 to only capture n-number of seconds of audio per defined time interval (e.g., only capture 5 seconds of audio per 30 seconds of conversation, etc.). In yet another example, privacy module 414 may dynamically change the sampling rate, or even stop all recording, based on the locations and/or identities of the conversation participants.

Privacy module 414 may also be configured to ensure that audio data 402 is encrypted and/or deleted within a defined period of time. For example, privacy module 414 may coordinate with the audio capture device(s) 422 to ensure that the captured audio data 402 is sent in an encrypted fashion to conversation analysis process 248. This may be particularly true when audio data 402 is sent via a network to conversation analysis process 248. In other cases, privacy module 414 may encrypt audio data 402 on reception of audio data 402 from an audio capture device 422. Further, privacy module 414 may control the amount of time that audio data 402 is stored. For example, in some cases, audio data 402 may be transitory in nature and deleted by privacy module 414 after analysis by conversation analysis process 248.

Figure 5:
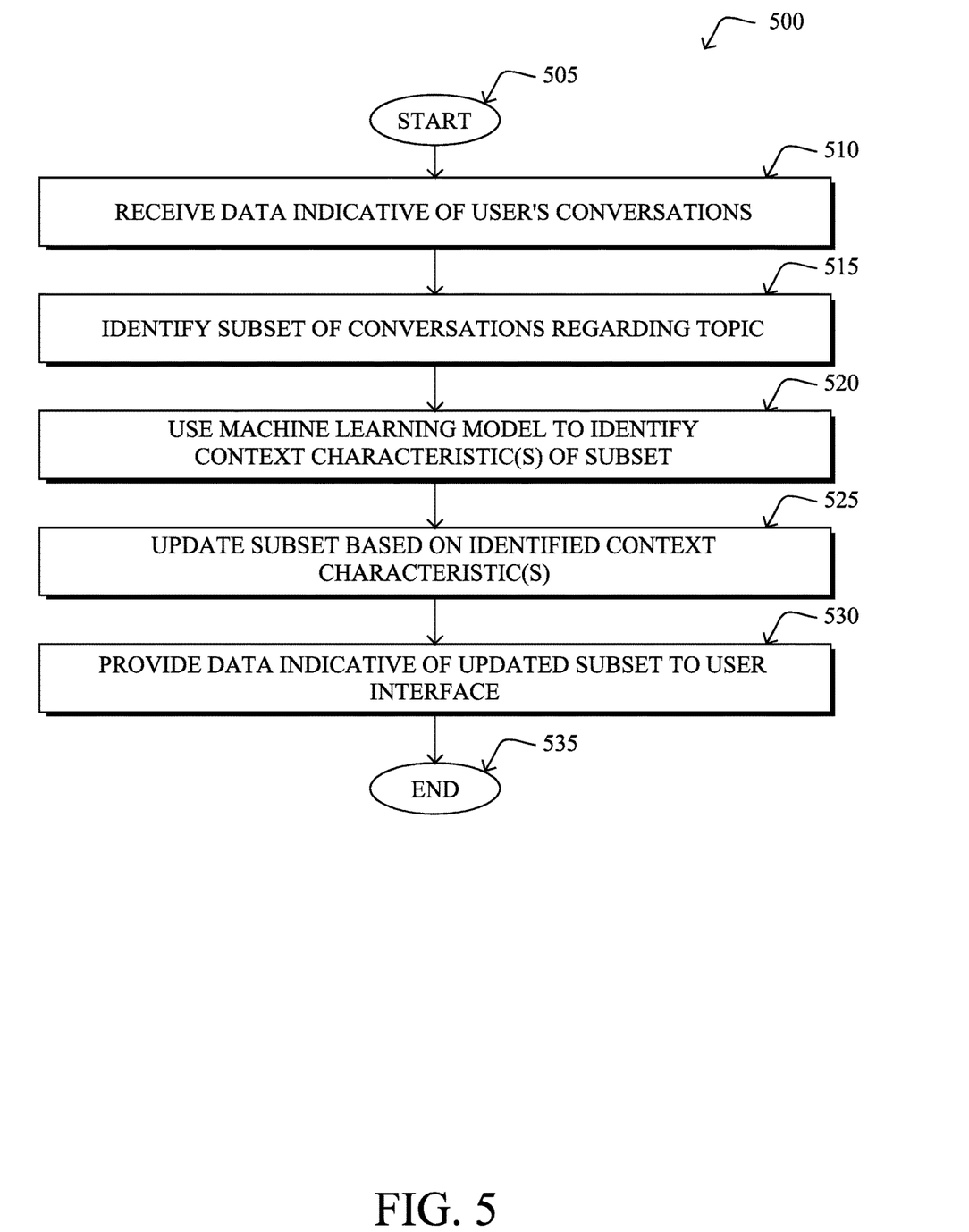
FIG. 5 illustrates an example simplified procedure for identifying and logging conversations using machine learning.

FIG. 5 illustrates an example simplified procedure for identifying and logging conversations using machine learning, in accordance with one or more embodiments described herein. For example, a non-generic, specifically configured device (e.g., device 200) may perform procedure 500 by executing stored instructions (e.g., process 248), to provide a conversation analysis service in a network. The procedure 500 may start at step 505, and continues to step 510, where, as described in greater detail above, the processor of the device may receive data indicative of a plurality of conversations involving a primary user. As noted above, the data may include the full audio of the conversations or only a portion thereof. Further, the data may be encrypted, in some cases, for privacy reasons.

At step 515, as detailed above, the processor may identify a subset of the plurality of conversations that are regarding a particular topic. In some embodiments, the processor adds a conversation to the subset based on a match between one or more keywords in the conversation matching a list of keywords associated with the particular topic. For example, the processor may use natural language processing (NLP) or another technique, to compare keywords spoken in the conversations to a list of keywords associated with the topic. The processor may also distinguish between different topics by applying weights to the different keywords, such as based on their term frequencies in a given conversation, the strength of association with the topic, etc.

At step 520, the processor may use a machine learning-based model to identify one or more context characteristics of the conversations in the identified subset, as described in greater detail above. As noted, decision trees represent one form of machine learning that may be well suited for this application. In other implementations, statistical models could be constructed to identify the context characteristic(s) of the conversations. For example, the context characteristics of the conversations in the subset may include the keywords spoken, the identities of the participants, the location(s) of the participants, etc.

At step 525, as detailed above, the processor may update the subset of conversations by adding at least one of the conversations to the subset based on the at least one conversation having at least one context characteristic identified by the machine learning-based model. For example, the processor may identify a keyword that is frequently used in the conversations associated with a given topic, but is not in the list of keywords associated with the topic. By learning that this keyword is also likely associated with the topic, the processor can identify other conversations in which this keyword was uttered, to add those other conversations to the subset, as well.

At step 530, the processor may provide data indicative of the updated subset of conversations to a user interface for review by the primary user, as described in greater detail above. In one embodiment, the processor may provide display data to the interface indicative of a timeline of the conversations in the subset, allowing the primary user to review when, where, and with whom the user spoke about the topic. In another embodiment, the processor may provide task information to the user interface, either by is creating a task automatically from the conversations or by suggesting such a task to the primary user via the user interface. Procedure 500 then ends at step 535.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the automatic logging and analysis of conversations involving a primary user. From this analysis, conversations can be categorized by topic and data regarding the conversations can be provided to the primary user for review.

While there have been shown and described illustrative embodiments that provide for the identification and logging of conversations using machine learning, it is to be understood that various other adaptations and modifications may be made within the spirit and scope of the embodiments herein. For example, while certain embodiments are described herein with respect to using certain models for purposes of modeling conversations, the models are not limited as such and may be used for other functions, in other embodiments. In addition, any suitable form of audio capture may be used, be it a stand-alone audio capture device, a microphone integrated into another device (e.g., a computer, smart phone, wearable device, etc.), a capture of a telephone conversation, a capture of a web-based conference, or the like.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a processor in a network, audio data captured by one or more audio capture devices in the network, the audio data comprising data indicative of a plurality of conversations involving a primary user;
identifying, by the processor, a subset of the plurality of conversations that are regarding a particular topic, wherein the processor adds a conversation to the subset based on a match between one or more keywords in the conversation matching a list of keywords associated with the particular topic;
using, by the processor, a machine learning-based model to identify one or more context characteristics of the conversations in the identified subset by learning over time one or more new keywords associated with the particular topic but not included in the list of keywords associated with the particular topic;
updating, by the processor, the subset of conversations by adding at least one of the conversations to the subset based on the at least one conversation having at least one context characteristic identified by the machine learning-based model; and
providing, by the processor, data indicative of the updated subset of conversations to a user interface for review by the primary user, wherein the data indicative of the updated subset of conversations comprises a timeline of the conversations in the subset.

2. The method as in claim 1, wherein the at least one context characteristic identified by the machine learning-based model comprises a particular person associated with one or more of the conversations in the subset.

3. The method as in claim 1, wherein the one or more new keywords learned by the machine learning-based model are present in the subset of conversations.

4. The method as in claim 3, further comprising:
updating, by the processor, the list of keywords associated with the particular topic to include the learned one or more new keywords.

5. The method as in claim 1, wherein the audio data is captured from a videoconference.

6. The method as in claim 1, further comprising:
receiving the list of keywords associated with the particular topic from the particular user via the user interface.

7. The method as in claim 1, further comprising:
capturing the data indicative of the plurality of conversations involving the primary user by comparing one or more locations of the primary user to a set of locations at which audio capture is authorized.

8. The method as in claim 1, wherein identifying the subset of conversations that are regarding a particular topic comprises:
extracting, by the processor and from the received data associated with a particular one of the plurality of conversations, one or more keywords in the particular conversation; and
deleting, by the processor, the received data associated with the particular conversation, after extracting the one or more keywords from the received data associated with the particular conversation.

9. An apparatus, comprising:
one or more network interfaces to communicate with a network;
a processor coupled to the network interfaces and configured to execute one or more processes; and
a memory configured to store a process executable by the processor, the process when executed configured to:
receive audio data captured by one or more audio capture devices in the network, the audio data comprising data indicative of a plurality of conversations involving a primary user;
identify a subset of the plurality of conversations that are regarding a particular topic, wherein the processor adds a conversation to the subset based on a match between one or more keywords in the conversation matching a list of keywords associated with the particular topic;
use a machine learning-based model to identify one or more context characteristics of the conversations in the identified subset by learning over time one or more new keywords associated with the particular topic but not included in the list of keywords associated with the particular topic;
update the subset of conversations by adding at least one of the conversations to the subset based on the at least one conversation having at least one context characteristic identified by the machine learning-based model, wherein the data indicative of the updated subset of conversations comprises a timeline of the conversations in the subset; and
provide data indicative of the updated subset of conversations to a user interface for review by the primary user, wherein the data indicative of the updated subset of conversations comprises a timeline of the conversations in the subset.

10. The apparatus as in claim 9, wherein the at least one context characteristic identified by the machine learning-based model comprises a particular person associated with one or more of the conversations in the subset.

11. The apparatus as in claim 9, wherein the one or more new keywords learned by the machine learning-based model are present in the subset of conversations.

12. The apparatus as in claim 9, wherein the process when executed is further configured to:
update the list of keywords associated with the particular topic to include the learned one or more new keywords.

13. The apparatus as in claim 9, wherein the audio data is captured from a videoconference.

14. The apparatus as in claim 9, wherein the process when executed is further configured to:
receive the list of keywords associated with the particular topic from the particular user via the user interface.

15. The apparatus as in claim 9, wherein the process when executed is further configured to:
capture the data indicative of the plurality of conversations involving the primary user by comparing one or more locations of the primary user to a set of locations at which audio capture is authorized.

16. The apparatus as in claim 9, wherein the apparatus identifies the subset of conversations that are regarding a particular topic comprises:
extracting, from the received data associated with a particular one of the plurality of conversations, one or more keywords in the particular conversation; and
deleting the received data associated with the particular conversation, after extracting the one or more keywords from the received data associated with the particular conversation.

17. A method comprising:
receiving, at a processor in a network, audio data captured by one or more audio capture devices in the network;
capturing, by the processor and from the received audio data, data indicative of a plurality of conversations involving a primary user by comparing one or more locations of the primary user to a set of locations at which audio capture is authorized;
identifying, by the processor, a subset of the plurality of conversations that are regarding a particular topic, wherein the processor adds a conversation to the subset based on a match between one or more keywords in the conversation matching a list of keywords associated with the particular topic;
using, by the processor, a machine learning-based model to identify one or more context characteristics of the conversations in the identified subset by learning over time one or more new keywords associated with the particular topic but not included in the list of keywords associated with the particular topic;
updating, by the processor, the subset of conversations by adding at least one of the conversations to the subset based on the at least one conversation having at least one context characteristic identified by the machine learning-based model; and
providing, by the processor, data indicative of the updated subset of conversations to a user interface for review by the primary user.

* * * * *

UNITED STATES PATENT AND TRADEMARK OFFICE
CERTIFICATE OF CORRECTION

PATENT NO. : 10,819,667 B2
APPLICATION NO. : 15/916422
DATED : October 27, 2020
INVENTOR(S) : Hazim Hashim Dahir et al.

It is certified that error appears in the above-identified patent and that said Letters Patent is hereby corrected as shown below:

In the Specification

In Column 12, Line 54, please amend as shown:
task information to the user interface, either by creating a Signed and Sealed this
Nineteenth Day of January, 2021

Andrei Iancu
*Director of the United States Patent and Trademark Office*